United States Patent Office 3,042,648
Patented July 3, 1962

3,042,648
COMPOSITION COMPRISING AN ACRYLONITRILE POLYMER AND A 2,4-DIAMINO-5-ARYL-6-HYDROXY PYRIMIDINE DYE
Charles E. Lewis, Somerville, N.J., assignor to American Cyanamid Company, New York, N.Y., a corporation of Maine
No Drawing. Original application Jan. 11, 1957, Ser. No. 633,525. Divided and this application Apr. 25, 1958, Ser. No. 730,803
3 Claims. (Cl. 260—41)

This invention relates to colored acrylic polymers and to a process for producing them. More particularly, it relates to acrylic polymers containing at least 85% by weight acrylonitrile which have been colored with a 2,4,6-trisubstituted-5-arylazopyrimidine, the 2-substituent of which is an amino or substituted amino group, at least one of the 4- and 6-substituents is an amino group and the other, when not an amino group, is hydroxyl. More particularly, it also relates to a process of dyeing such acrylic fibers especially those free of basic monomers with such dyes from a dilute acid bath insufficiently acid to form a salt of the dyestuff. This application is a division of my copending application, Serial No. 633,525, filed January 11, 1957.

The development of new synthetic fibers has created many new problems for the textile and dyeing industries. Some of the most refractory fibers to dyeing processes have proved to be those comprising polyacrylonitrile and its copolymers. In order to get dyeability many manufacturers of acrylic fibers have been forced to add basic monomers such as vinyl pyridine and methyl vinyl pyridine to their composition. In some respects, this method of achieving dyeability sacrifices other textile properties of polyacrylonitrile. For this reason, polyacrylonitriles free of basic monomers are still produced in large quantities in order to supply to the textile trade fibers having the peculiar properties only obtainable by that means. Thus, the problem still remains of how to dye such fibers. Also, even those polyacrylic fibers which contain basic comonomers are not always dyed and there is a need for new, strong colors for use on them.

One of the methods which has been used to dye polyacrylic fibers has been to use the standard disperse dyes common for acetate fibers. However, these have very serious deficiencies in color value. Only pale shades are obtained under normal dyeing conditions and medium shades are obtainable only under pressure at temperatures of 135°–145° C., or in the presence of certain carriers. Further, these dyes do not exhaust properly. This lack of affinity of disperse dyes for acrylic fibers is very thoroughly described in an article in "British Rayon and Silk Journal," vol. 28, page 62 (1951).

It has been proposed to assist the substantivity of dispersed acetate colors by the use of swelling agents such as 1–5% solutions of metacresole. However, in order to obtain high strength dyeings on acrylic fibers, the dyes most commonly used are the water soluble salt-like dyes in which the chromophore is the cation. These are the so-called basic dyes. Such dyes have a very rapid rate of dye exhaust and are hard to apply evenly to acrylic fibers having high acrylonitrile content.

I have discovered that polyacrylonitrile containing at least 85% acrylonitrile and especially those free of basic comonomers, can be effectively dyed very strong shades by azopyrimidine dyes belonging to the class defined as 2,4,6-trisubstituted-5-arylazopyrimidines, the 2-substituent of which is an amino or sub-substituted amino group, at least one of the 4- and 6-substitutents is an amino group, and the other, when not an amino group, is hydroxyl. I have discovered further that polyacrylonitrile has a high affinity for such dyestuffs, especially from an acid bath in which there is insufficient acid to form a salt of the dyestuff.

It is particularly surprising that the colored fibers of my invention can be so readily achieved since the dyestuffs used have little water solubility at the pH used in the dyeing process. The dye bath is usually a dilute acid medium of about pH 3.0–6.0, although higher pH's can be used when basic comonomers are present in the polymer and is never strong enough to form the salt of the dyestuff. The chromophore is therefore not in the cationic state. Nevertheless, these build up on the fiber to a strength which far surpasses that obtainable with the known insoluble and neutral chromophores, that is, the dispersed acetate dyes. This is important because the dyestuffs in which the chromophore is in the cationic state are perforce, to some extent, sensitive to higher pH's.

It is especially surprising that the dyestuffs which are used to form the colored polyacrylonitriles of my invention show such good affinity for these difficult-to-dye polymers. The dyestuffs which are used in my invention have the general formula:

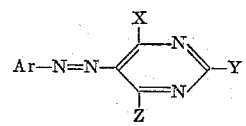

in which Ar is an aryl group and X, Y and Z are, respectively, 4-, 2- and 6-substituents. It is absolutely necessary that Y be an amino group, that is, either $NH_2$ or a substituted amino group. It is also necessary that either X or Z, or both, be an amino group of the same definition. The azopyrimidine dyes derived from 2-amino-4,6-dihydroxypyrimidine, 2-hydroxy-4,6-diamino-pyrimidine and 2,4,6-trihydroxypyrimidine are not substantive on polyacrylonitriles. The structure of azopyrimidine dyes necessary to obtain substantivity is very specific. In view of the complete lack of substantivity of these other closely related compounds, it was completely unpredictable that such strong dyeings could be obtained from the peculiar configuration of the dyes used in my invention.

The azopyrimidines used in my invention are prepared by methods known in the art. One such method is to condense an aromatic or heterocyclic nitroso compound with a suitable 5-aminopyrimidine to form the arylazopyrimidine directly. Other variations of the condensation methods can be used by condensing a suitable aryl nitroso compound with an amino compound to form an azo compound which is then further condensed to form the pyrimidine ring. The usual synthesis is by the coupling reaction, either by using a diazotized 5-aminopyrimidine to couple into an aromatic compound, or by using an aromatic diazo to couple it to a 5-unsubstituted pyrimidine. The last method is the usual one used to prepare these compounds. These methods of preparation can be illustrated by the following equations:

(1)

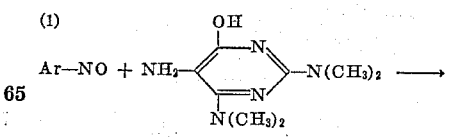

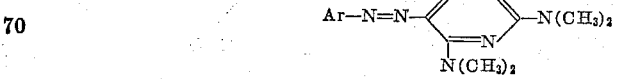

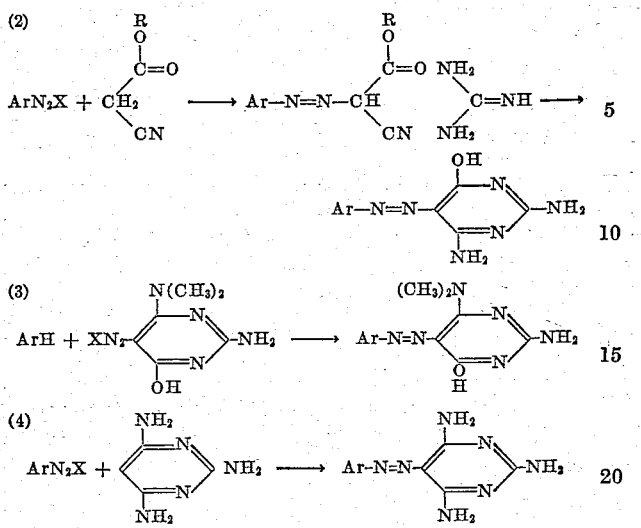

The first equation illustrates the use of nitroso compounds in a condensation reaction to form the azo group. The second illustrates the condensation of an azo compound used to build the pyrimidine nucleus. The diazotization methods are illustrated by Equations 3 and 4.

The preferred method of preparing the azopyrimidine dyes to be used in my invention is illustrated by Equation 4. The arylamines which may be used to couple into a 5-unsubstituted pyrimidine include aniline and its derivatives such as the various chloranilines, the various alkoxyanilines, their benzamido and para-sulfonyl derivatives, naphthylamines such as alpha-naphthylamine and beta-naphthylamine, biphenylamines such as 4-aminobiphenyl, aminodiphenylamines such as 4-aminodiphenylamine, amino azo compounds such as 4-aminoazobenzene, cyano anilines, and the like.

The aminopyrimidines into which the aryl diazo is to be coupled include such compounds as 2,4-diamino-6-hydroxy pyrimidine, 2,4,6-triaminopyrimidine, 2-amino-4-β-hydroxyethylamino-6-hydroxypyrimidine, 2-amino-4-ethoxycarbonylmethylamino-6-hydroxypyrimidine, 2,4-diamino-6-dimethylaminopyrimidine, 2,4-diamino-6-diethylaminopyrimidine, 2,4-diamino-6-dialkylaminopyrimidine, 4,6-diamino-2-diethylaminopyrimidine, 4,6-diamino-2-diallylaminopyrimidine, 2 - amino - 4,6 - di - (monomethylamino) pyrimidine, 4-amino-2-diallylamino-6-hydroxypyrimidine, and the like. The preferred pyrimidines are the simple 2,4-diamino-6-hydroxypyrimidine and its 2-dialkylamino analogues. It should be noted that the following pyrimidines do not give dyestuffs which are substantive on polyacrylonitrile, namely, 4,6-diamino-2-hydroxypyrimidine, 2-amino-4,6-dihydroxypyrimidine, and 2,4,6-trihydroxypyrimidine. Examples of the dyestuff combinations which are preferred in the coloring of polyacrylonitriles are the following:

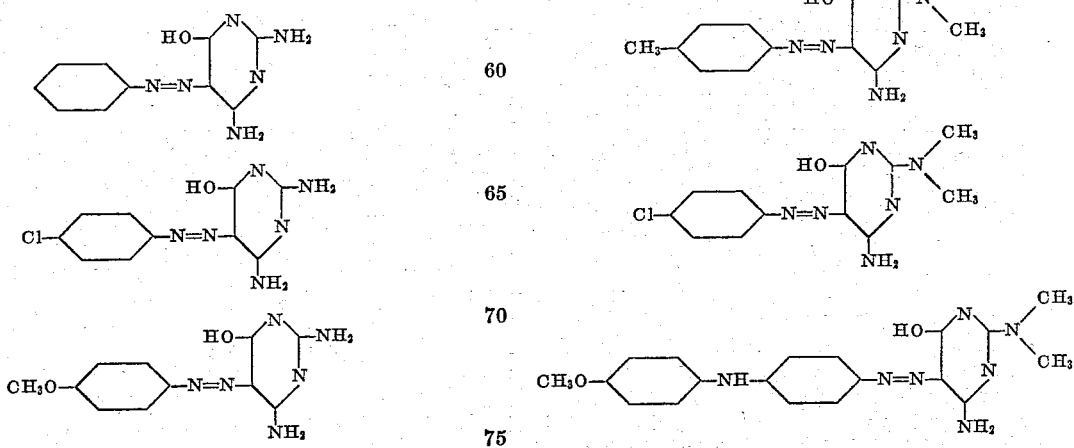

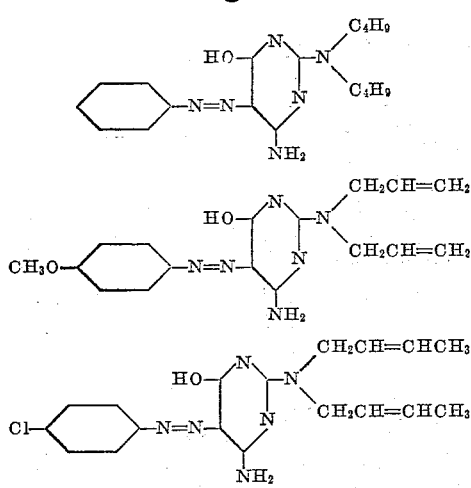

The polyacrylonitriles which fall within the scope of my invention are those polymers and copolymers of acrylonitriles which contain at least 85% by weight acrylonitrile, especially those which contain no basic comonomers, that is, comonomers capable of forming salts with acids. Examples of such comonomers which are not present in the preferred aspect of my invention are methylvinylpyridine and vinyl pyridine. Other comonomers which may be copolymerized with the acrylonitrile without affecting dyeability include such compounds as methyl acrylate, vinyl acetate and vinyl chloride. Of the polyacrylonitriles available commercially which can preferably be used to form the colored polyacrylonitriles of my invention, one is 100% polyacrylonitrile, and another is approximately 95% acrylonitrile and approximately 5% methyl acrylate. Those copolymers of acrylonitrile in which substantial amounts of a basic comonomer is used show decreased affinity for the dyestuffs used in my invention. Such polymers are commercially available and one such has a composition of 94% acrylonitrile, 5% methylvinylpyridine, and 1% vinyl acetate. Such polymers can also be colored by these azopyrimidine dyes. However, those lacking the basic comonomer not only present a more serious problem in dyeability when using previously available dyes but also, and surprisingly, are dyed better and stronger by these azopyrimidine dyes.

In the practice of my invention the dyestuffs are used either in a paste form or in a finely divided dry state. The slightly acidic aqueous dye bath is held at or near the boiling point. Usually, dispersing agents such as a sodium lignin sulfonate or a fatty alcohol sodium sulfate is included in the dye bath. Preferably, the dispersing agent is blended with the finely divided dye powder. A number of the dyes are sufficiently soluble that they require no dispersing agent.

It is an advantage of my invention that the dyes used in the process of my invention show many points of superiority over the ordinary disperse dyes heretofore used in the neutral coloring of polyacrylonitriles. They build up on the fiber to a high strength of color, far in excess of those obtained with the known neutral acetate dispersed dyes. They exhaust far better than these latter dyes, going on the polymers readily below the boil, beginning at 170° F. and going on well at 200° F. in an open vessel, all in contrast to the difficulty with which the ordinary acetate dispersed dye is placed on polyacrylonitrile polymers. It is a further advantage of my invention that the fibers colored with these dyes have a lightfastness superior to the disperse dyes when placed on acrylic fibers. In affinity they equal the class of basic dyes, which are now used to dye polyacrylonitriles and in lightfastness they surpass the selected basic dyes now used to dye acrylic polymers. They are also far better than the basic dyes in their stability of shade to pH change, especially with the yellow and orange dyes of our invention. This property is important in preventing shade changes due to alkaline perspiration. In pH stability they are far better than the weakly basic amino azo types which are also used to color polyacrylic polymers. It is a still further advantage of my invention that the rate of exhaust is slower than that of the basic dyes. Basic dyes go on acrylic polymers so fast that it is difficult to achieve level dyeings and very often retarding agents must be used in order to obtain such level dyeings. It is an additional advantage of my invention that polyacrylic fibers dyed with the class of dyes which I use are quite fast to washing and wet treatments as well as to dry cleaning and crocking.

One of the types of dyes used in my invention which is of importance is the type derived from 2-diloweralkyl or 2 - dilower alkenyl - 4 - amino-6-hydroxypyrimidine. These dyes show greater solubility than the other types included in my invention, a property of great advantage in building up heavy shades as well as in ease of handling by the dyer. The substituent groups on the 2-amino group can be any lower alkyl such as methyl, ethyl, propyl, isopropyl, butyl, and the like, although methyl is preferred. It may also be a lower alkenyl group such as allyl, methallyl, or 2-butenyl, of which allyl is preferred.

I have described my invention as being polyacrylonitrile polymers colored with a specific class of dyes. The polymers are usually used in a fiber form either as a yarn or as a fabric. However, many other fabricated articles may be made of such polymers containing at least 85% by weight of polyacrylonitrile and lacking basic comonomers. The dye can be added to the acrylonitrile polymer before it is shaped so that it may be used in making colored beads, granules, powders, films tubings and other molded articles. The dyestuffs can also be used to print on fabrics comprising polyacrylonitriles of this definition.

My invention can be illustrated by the following examples in which parts are by weight unless otherwise indicated.

EXAMPLE 1

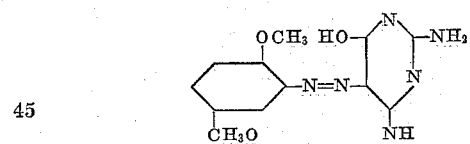

2,5-dimethoxyaniline (7.65 parts) is dissolved in a mixture of 100 parts of water and 30 parts by volume of 5 N hydrochloric acid, by heating. Ice is added to cool the mixture to 5° C., and to give a volume of 250 parts. The amine is then diazotized by adding about 50 parts by volume in sodium nitrite solution.

10.8 parts of 68.2% 2,4-diamino-6-hydroxypyrimidine (in the form of its sulfate) is added to 100 parts of water and dissolved, with stirring, by the addition of 25 parts by volume of 5 N sodium hydroxide solution. Forty parts by volume of 20% sodium carbonate solution is then added. Ice is added until the temperature of the solution is 10° C. and the volume is about 300 parts. Upon addition of the solution of diazo prepared above a brown precipitate forms. When coupling is complete, the dyestuff is isolated by filtration and dried.

When dyed on a fiber comprising 94% acrylonitrile and 6% methylacrylate, using the procedure of Example 8, a reddish-brown shade is obtained which has good fastness to light and to alkaline perspiration, good wash fastness and good fastness to crocking.

EXAMPLE 2

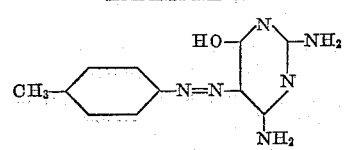

Sixteen parts of p-toluidine are dissolved in 200 parts of water and 90 parts by volume of 5 N hydrochloric acid. When a solution is obtained, it is clarified with animal charcoal and 200 parts of water and ice are added until the temperature is 0° C. 20.2 parts by volume of 7.5 N sodium nitrite solution is added as rapidly as possible and the mixture is stirred until diazotization is complete while adding ice to hold below 8° C. Any excess nitrite is removed with sulfamic acid.

28.6 parts of 2,4-diamino-6-hydroxypyrimidine sulfate containing 68.2% real base is dissolved in 400 parts by volume of water. One hundred parts by volume of 20% sodium carbonate solution and 75 parts by volume of 5 N sodium hydroxide solution are added. The solution of diazo is then added to this solution. The coupling temperature is about 15° C. When the coupling is complete the 5-(p-tolylazo)-2,4-diamino - 6 - hydroxypyrimidine is isolated by filtration, washed with water until it is free from alkali and dried.

When this dye is applied to fibers consisting of 100% polyacrylonitrile, or of 95% acrylonitrile and 5% methyl acrylate, or of 85% acrylonitrile and 15% methylacrylate, bright yellow shades of good fastness to light and to alkaline perspiration are obtained.

EXAMPLE 3

The following azopyrimidine dyes are prepared using the method of Example 2 and dyed on fibers comprising either 100% acrylonitrile, 95% acrylonitrile and 5% methylacrylate or 94% acrylonitrile and 6% methyl acrylate, using the method of Example 8. The shade obtained is shown.

| Amines Diazotized and Coupled to 2,4-Diamino-6-hydroxy-pyrimidine | Shade |
|---|---|
| Aniline | Greenish-yellow. |
| p-Chloroaniline | Yellow. |
| m-Chloroaniline | Do. |
| p-Anisidine | Yellow-orange. |
| p-Methylsufonylaniline | Green shade yellow |
| 4-Benzamido-2, 5-diethoxy-aniline | Blue-red. |
| 4-Aminodiphenyl | Reddish-yellow. |
| 4-Aminodiphenylamine | Maroon. |
| 4-Amino-4'-methoxydiphenylamine | Violet. |
| 4-Phenylazoaniline | Orange. |
| 1-Naphthylamine | Red-orange |
| 1-Aminoanthraquinone | Yellow. |
| 8-Aminoquinoline | Yellow (dull). |
| 3-Aminopyridine | Do. |
| 4-Aminopyridine | Red-yellow (gold). |
| 2,4, 5-Triamino-6-hydroxy-pryimidine | Orange. |
| p-Aminostilbene | Do. |
| Sulfanilamide | Yellow. |
| 4-Cyano-2,5-diemthoxy-aniline | Reddish-orange. |

EXAMPLE 4

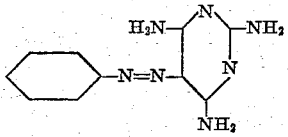

If, in the preceding Example 3, in the first combination listed, 2,4-diamino-6-hydroxypyrimidine is replaced by 2,4,6-triaminopyrimidine, a yellow shade is obtained on polyacrylonitrile fibers.

EXAMPLE 5

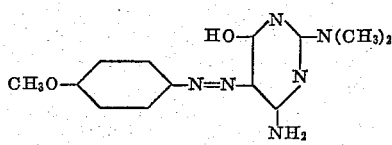

If, in the fourth dye in Example 3, 2,4-diamino-6-hydroxypyrimidine is replaced by an equivalent amount of 4-amino-2-dimethylamino - 6 - hydroxypyrimidine, a dye is obtained which gives full bright reddish-yellow shades on polyacrylonitrile fibers, using the dyeing procedure of Example 8. Other amines diazotized and coupled to 4-amino-2-dimethylamino - 6 - hydroxypyrimidine give the following shades:

| Amine | Shade |
|---|---|
| p-Toluidine | Red-yellow. |
| 4-Amino-4'-Methoxydiphenyl-amine | Violet. |
| p-Chloroaniline | Greenish-yellow. |

If the methyl groups are replaced with propyl groups, similar shades are obtained. Likewise, if the 4-amino groups is in each case replaced with a 4-monomethylamino group, similar shades are obtained.

EXAMPLE 6

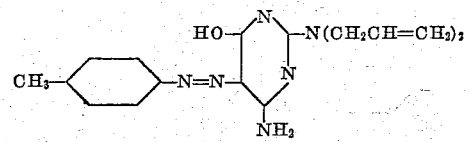

In Example 2, the 2,4-diamino-6-hydroxypyrimidine is replaced with an equivalent amount of 4-amino-2-diallylamino-6-hydroxypyrimidine, and a dye is obtained which dyes fibers consisting of 95% acrylonitrile and 5% methylacrylate, yellow shades of good fastness to light and to alkaline perspiration.

EXAMPLE 7

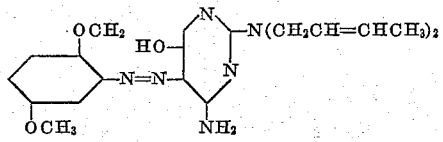

In Example 1, the 2,4-diamino-6-hydroxypyrimidine is replaced by an equivalent amount of 4-amino-2-di(2-butenyl)amino - 6 - hydroxypyrimidine, and a dye is obtained which dyes fibers comprising 94% acrylonitrile and 6% methylacrylate. A brown shade of good fastness to light and to washing is obtained.

EXAMPLE 8

*Dyeing procedure*

Acrylic fibers are dyed by the following procedure:
There is combined 40 parts of water per part-by-weight of fabric, fiber or fabricated acrylic article with 1 part of dyestuff, about 2 parts by weight of 28% acetic acid and 1.5–2.0 parts by weight of hydrated sodium acetate. The dye bath is heated to 200–212° F. for one hour. The fibers are then removed, rinsed and dried.

The azopyrimidines, when used to dye acrylic fibers by this method, have good exhaustion and give dyeings of good color value and good fastness to light, washing, alkaline perspiration and crocking.

EXAMPLE 9

To a selected piece of cloth consisting of 100% acrylonitrile there is added 40 parts of water per unit weight of the fiber and 1 part by weight of the next to last dyestuff of Example 3. The dye bath is heated at 200–212° F. for one hour at the end of which time the cloth is removed, rinsed and dried. An attractive yellow shade fast-to-light and stable to changes of pH is obtained.

If, a fabric composed of 95% acrylonitrile and 5% methyl acrylate is used, a similar dyeing is obtained.

EXAMPLE 10

To a piece of cloth weighing 5 grams and consisting of 88.7% acrylonitrile, 6.3% vinylpyridine and 5% vinyl acetate, is added 200 cc. water, 3 cc. of 5% Duponol Wa (a fatty alcohol sodium sulfate) and 0.5 g. of the dyestuff made by coupling p-anisidine to 2,4-diamino-6-hydroxypyrimidine. After boiling one hour at about pH 5.5, the cloth is removed from the bath, washed with water and dried. A yellow dyeing of good wash fastness is obtained.

EXAMPLE 11

To a piece of cloth weighing 5 grams and consisting of 94.16% acrylonitrile, 5.04% methylvinylpyridine and 0.80% vinyl acetate is added 200 cc. water, 3 cc. of 5% ammonium acetate solution and 0.5 gram of the dyestuff of Example 5. The mixture is boiled for one hour after which the cloth is rinsed with water and dried. The cloth is dyed a yellow shade.

I claim:

1. A composition of matter comprising (1) a polymer consisting of 85 to 100% acrylonitrile with 0 to 15% of at least one non-basic monoethylenic monomer copolymerizable with acrylonitrile and (2) a dye selected from the group consisting of 2,4-diamino-5-(p-anisylazo)-6-hydroxypyrimidine and 2,4-diamino-5-(p-tolylazo)-6-hydroxypyrimidine.

2. A polymer of claim 1 in which the dye is 2,4-diamino-5-(p-anisylazo)-6-hydroxypyrimidine.

3. A polyacrylonitrile polymer of claim 1 in which the dye is 2,4-diamino-5-(p-tolylazo)-6-hydroxypyrimidine.

References Cited in the file of this patent

UNITED STATES PATENTS

| | | |
|---|---|---|
| 2,532,437 | Baker | Dec. 5, 1950 |
| 2,675,375 | Marson et al. | Apr. 13, 1954 |
| 2,717,823 | Lowe | Sept. 13, 1955 |
| 2,819,943 | Rhyner et al. | Jan. 14, 1958 |

OTHER REFERENCES

Hartzel et al.: J.A.C.S. 76 (1954), 2263–2265.

Pelletier: American Dyestuff Reporter, April 9, 1956, article, "Effect of Dye Structure on the Dyeing of Orlon 42—Azo Dyes."